(12) United States Patent
Donzis

(10) Patent No.: US 12,574,346 B2
(45) Date of Patent: Mar. 10, 2026

(54) TRANSPARENT REPLACEMENT OF AN INTERNET PROTOCOL NETWORK ROUTER

(71) Applicant: PERFTECH, INC., San Antonio, TX (US)

(72) Inventor: Lewis T. Donzis, San Antonio, TX (US)

(73) Assignee: PERFTECH, INC., San Antonio, TX (US)

( * ) Notice: Subject to any disclaimer, the term of this patent is extended or adjusted under 35 U.S.C. 154(b) by 71 days.

(21) Appl. No.: 18/620,926

(22) Filed: Mar. 28, 2024

(65) Prior Publication Data

US 2025/0310292 A1 Oct. 2, 2025

(51) Int. Cl.
*H04L 61/103* (2022.01)
*H04L 61/4511* (2022.01)
*H04L 61/5014* (2022.01)

(52) U.S. Cl.
CPC ........ *H04L 61/103* (2013.01); *H04L 61/4511* (2022.05); *H04L 61/5014* (2022.05)

(58) Field of Classification Search
CPC . H04L 61/103; H04L 61/5014; H04L 61/4511
USPC .......................................... 709/245
See application file for complete search history.

(56) References Cited

U.S. PATENT DOCUMENTS

| | | | | |
|---|---|---|---|---|
| 5,473,599 A * | 12/1995 | Li | ........................... H04L 45/58 | |
| | | | | 714/4.11 |
| 9,491,084 B2 * | 11/2016 | McGee | ................... H04L 45/48 | |
| 2009/0073990 A1 * | 3/2009 | Patil | ....................... H04L 49/65 | |
| | | | | 370/396 |
| 2012/0324567 A1 * | 12/2012 | Couto | ................ H04L 41/0853 | |
| | | | | 709/224 |
| 2013/0198817 A1 * | 8/2013 | Haddad | ................... H04L 63/18 | |
| | | | | 726/5 |
| 2017/0311197 A1 * | 10/2017 | Lopes | .................... H04W 8/26 | |
| 2017/0325111 A1 * | 11/2017 | Reese | ..................... H04L 43/50 | |
| 2019/0190774 A1 * | 6/2019 | Kambhampati | ........ H04L 41/22 | |
| 2020/0280455 A1 * | 9/2020 | Mishra | ................... H04L 45/16 | |

OTHER PUBLICATIONS

Knight et al., "RFC 2338 Virtual Router Redundancy Protocol," 1998, RFC Editor, https://www.rfc-editor.org/rfc/pdfrfc/rfc2338.txt. pdf (Year: 1998).*
Li et al., "RFC 2281 Cisco Hot Standby Router Protocol (HSRP)," 1998, RFC Editor https://www.rfc-editor.org/rfc/pdfrfc/rfc2281.txt. pdf (Year: 1998).*
Unknown, "How to Perform ARP Scans", Mar. 5, 2023, web.archive. org https://web.archive.org/web/20230305142958/https://www. hackingloops.com/arp-scans/ (Year: 2023).*

* cited by examiner

*Primary Examiner* — Ruolei Zong

(57) ABSTRACT

An example operation may include one or more of establishing a connection with a local area network (LAN) network via a routing apparatus comprising a plurality of network connection ports, receiving a packet via a network connection port from among the plurality of network connections ports, detecting that the packet is of a new virtual local area network (VLAN), and automatically configuring a VLAN interface for new VLAN and deploying the VLAN interface at the routing apparatus.

20 Claims, 17 Drawing Sheets

Figure 2B:
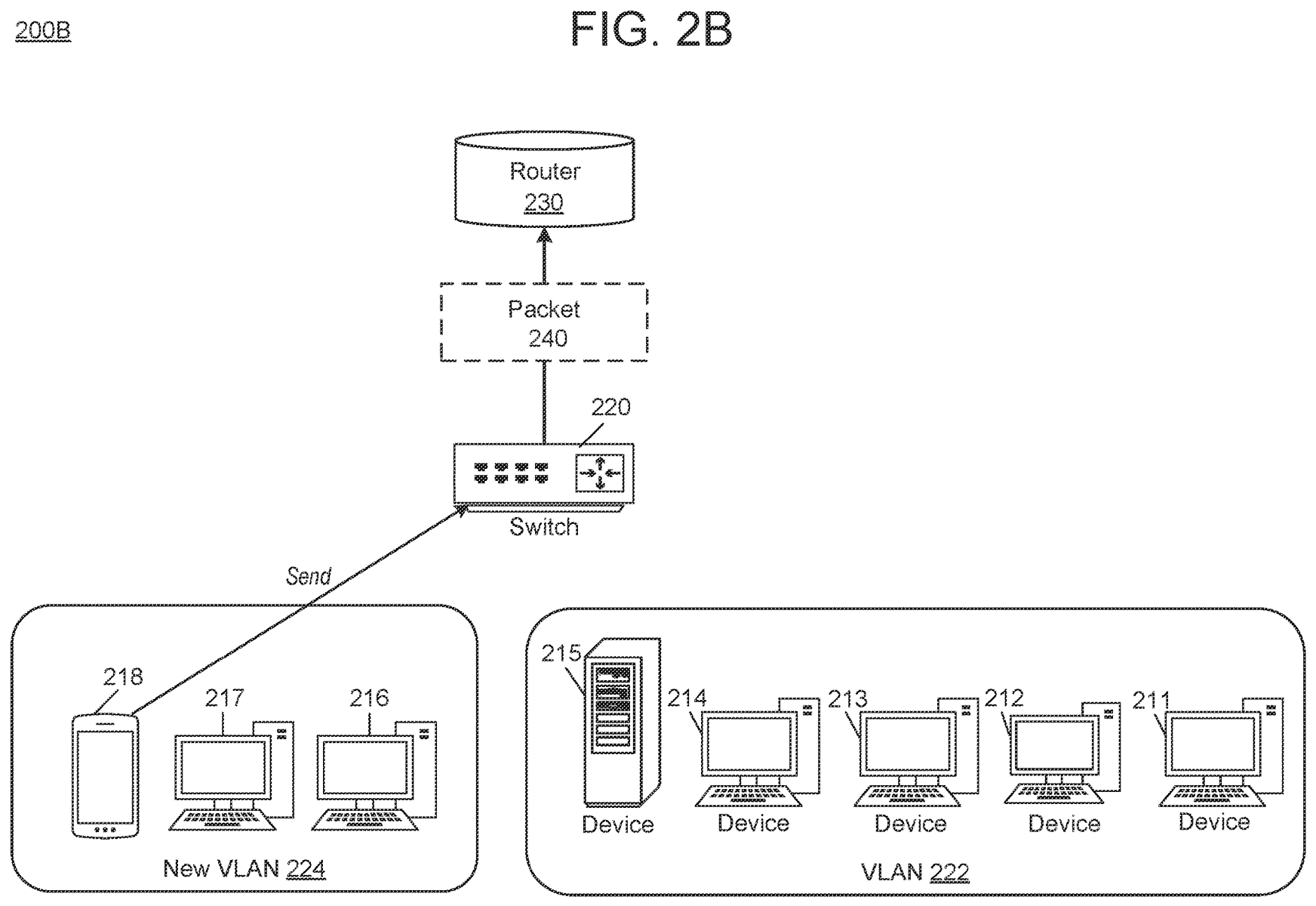

Router 230

Packet 240

220

Switch

Send

Device 211

Device 212

Device 213

Device 214

Device 215

VLAN 222

Device 216

Device 217

218

New VLAN 224

Figure 3A:
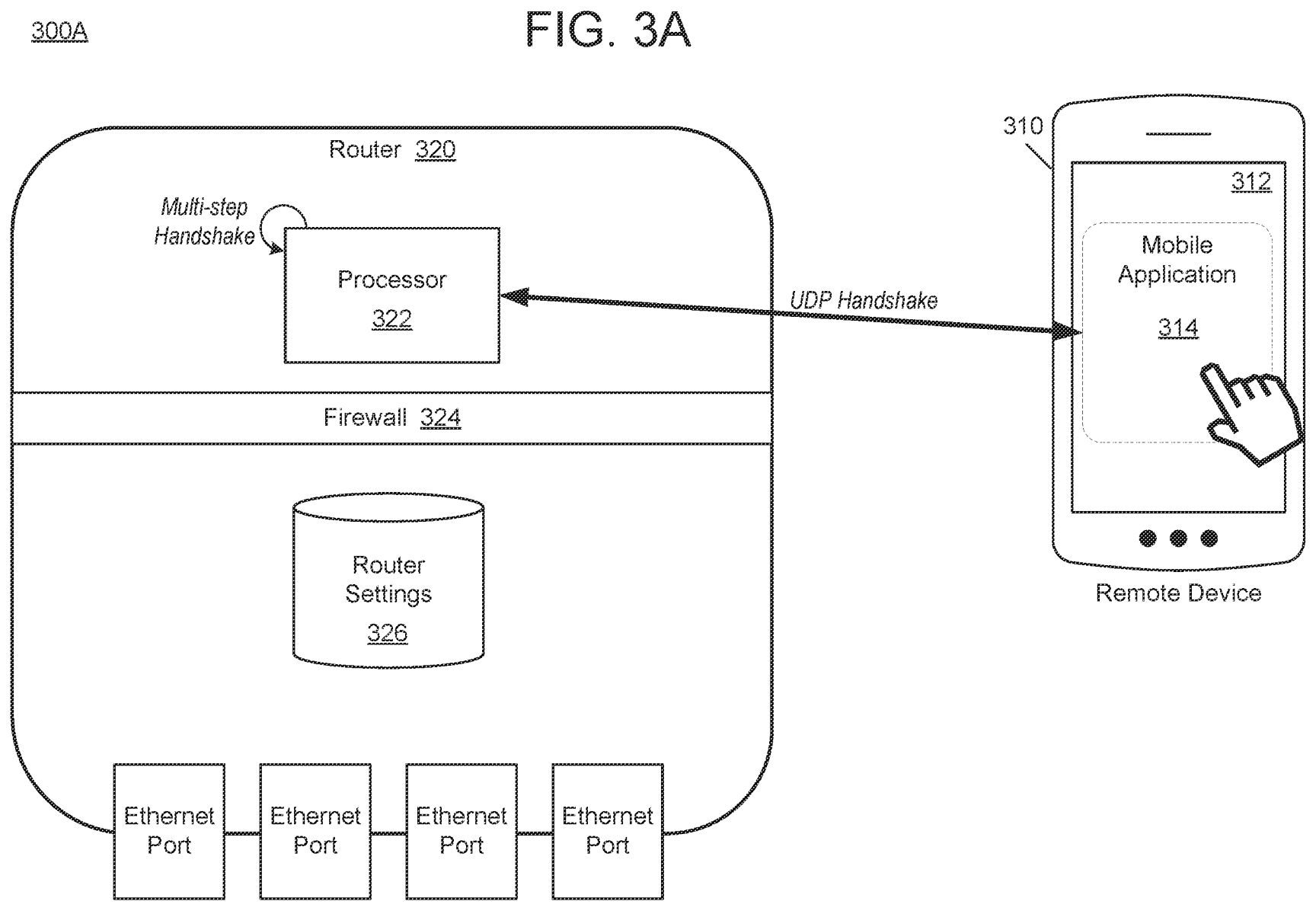

Router 320

Processor 322

Multi-step Handshake

Firewall 324

Router Settings 326

Ethernet Port

Ethernet Port

Ethernet Port

Ethernet Port

UDP Handshake

310

312

Mobile Application 314

Remote Device

Figure 3B:
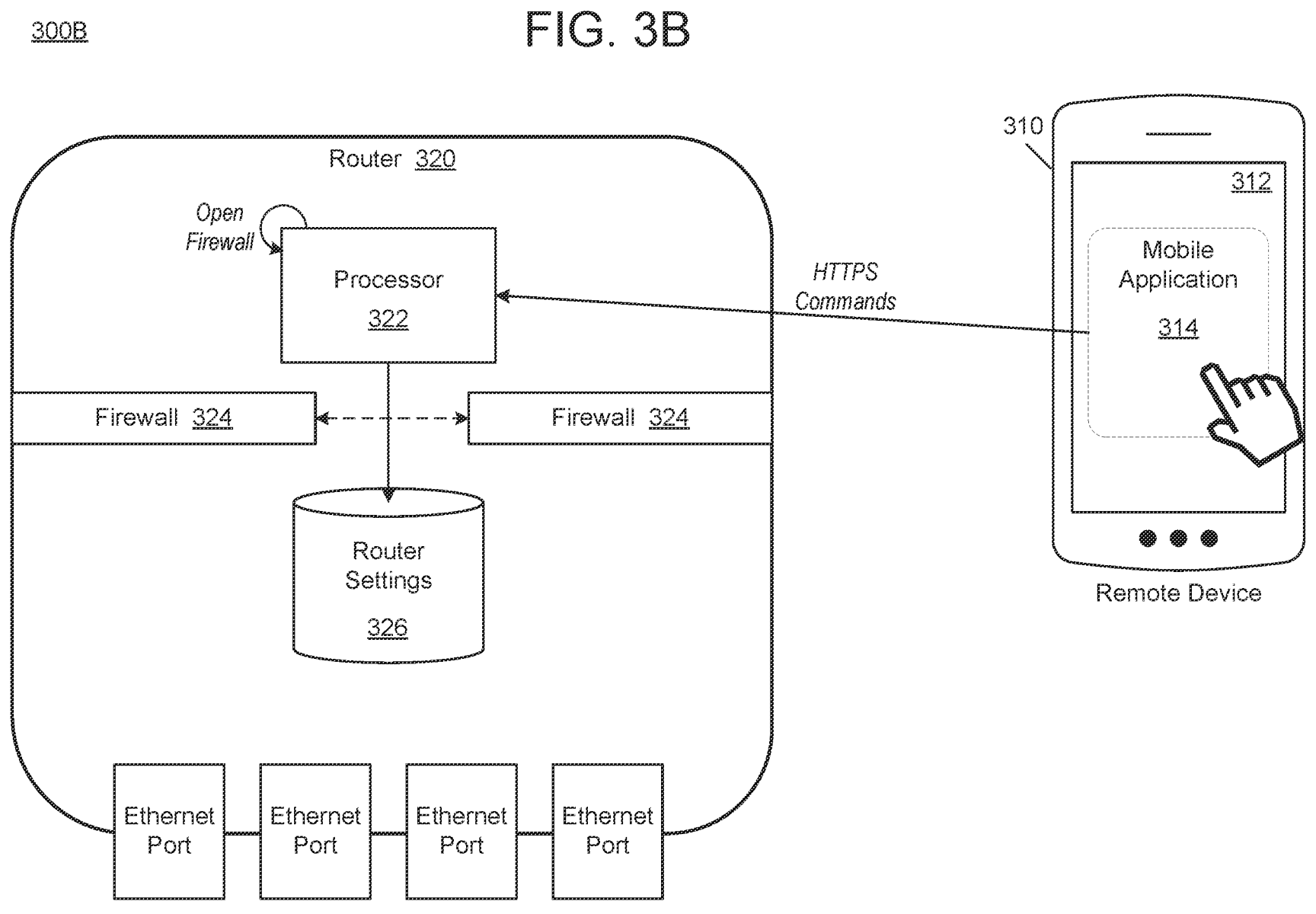

Mobile Application 314

Remote Device

HTTPS Commands

Router 320

Open Firewall

Processor 322

Firewall 324

Firewall 324

Router Settings 326

Ethernet Port

Ethernet Port

Ethernet Port

Ethernet Port

Figure 4C:
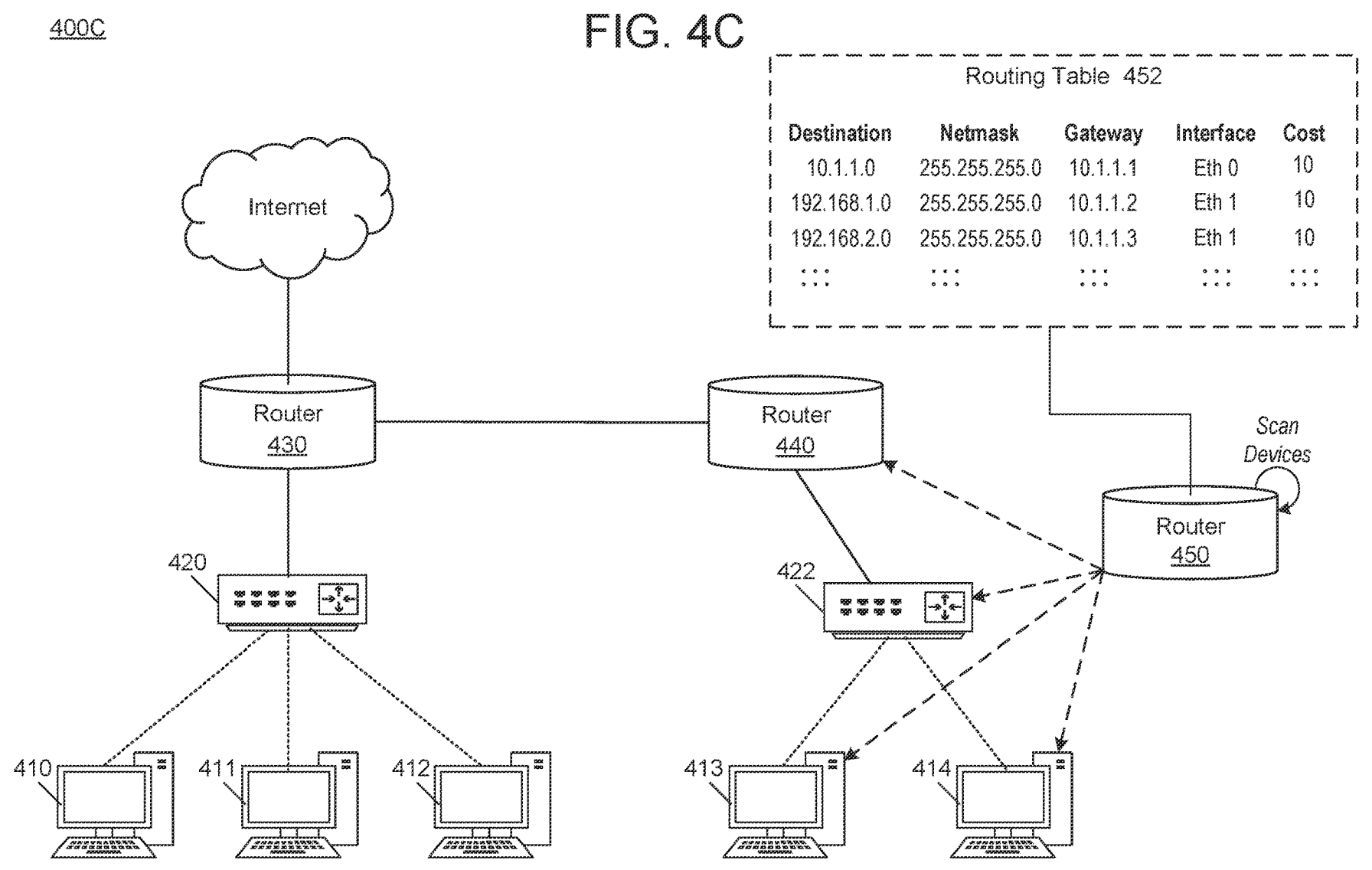

Routing Table 452

| Destination | Netmask | Gateway | Interface | Cost |
|---|---|---|---|---|
| 10.1.1.0 | 255.255.255.0 | 10.1.1.1 | Eth 0 | 10 |
| 192.168.1.0 | 255.255.255.0 | 10.1.1.2 | Eth 1 | 10 |
| 192.168.2.0 | 255.255.255.0 | 10.1.1.3 | Eth 1 | 10 |
| ::: | ::: | ::: | ::: | ::: |

Scan Devices

Router 450

Router 440

Router 430

Internet

422

420

410

411

412

413

414

400D

500   FIG. 5
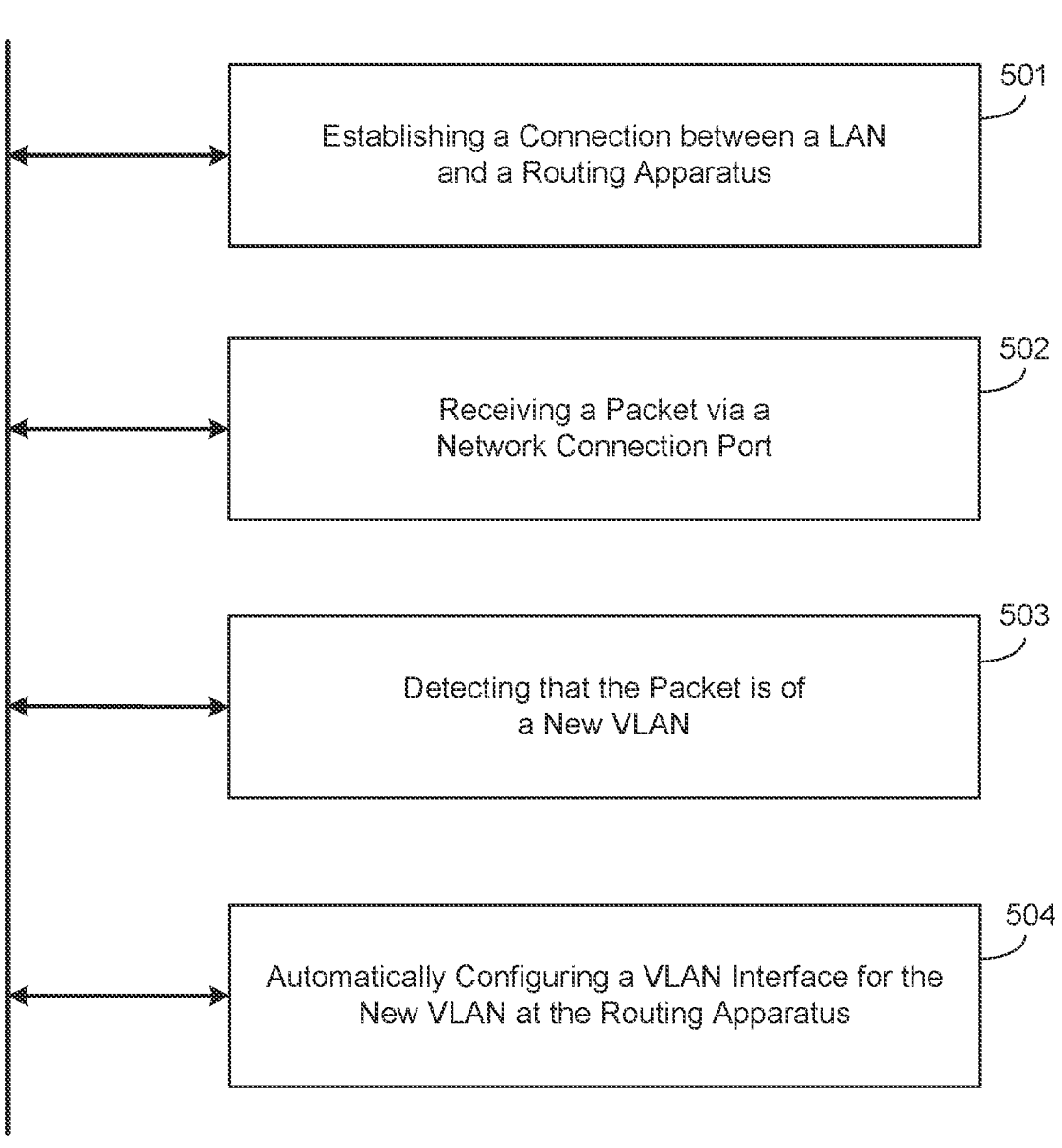

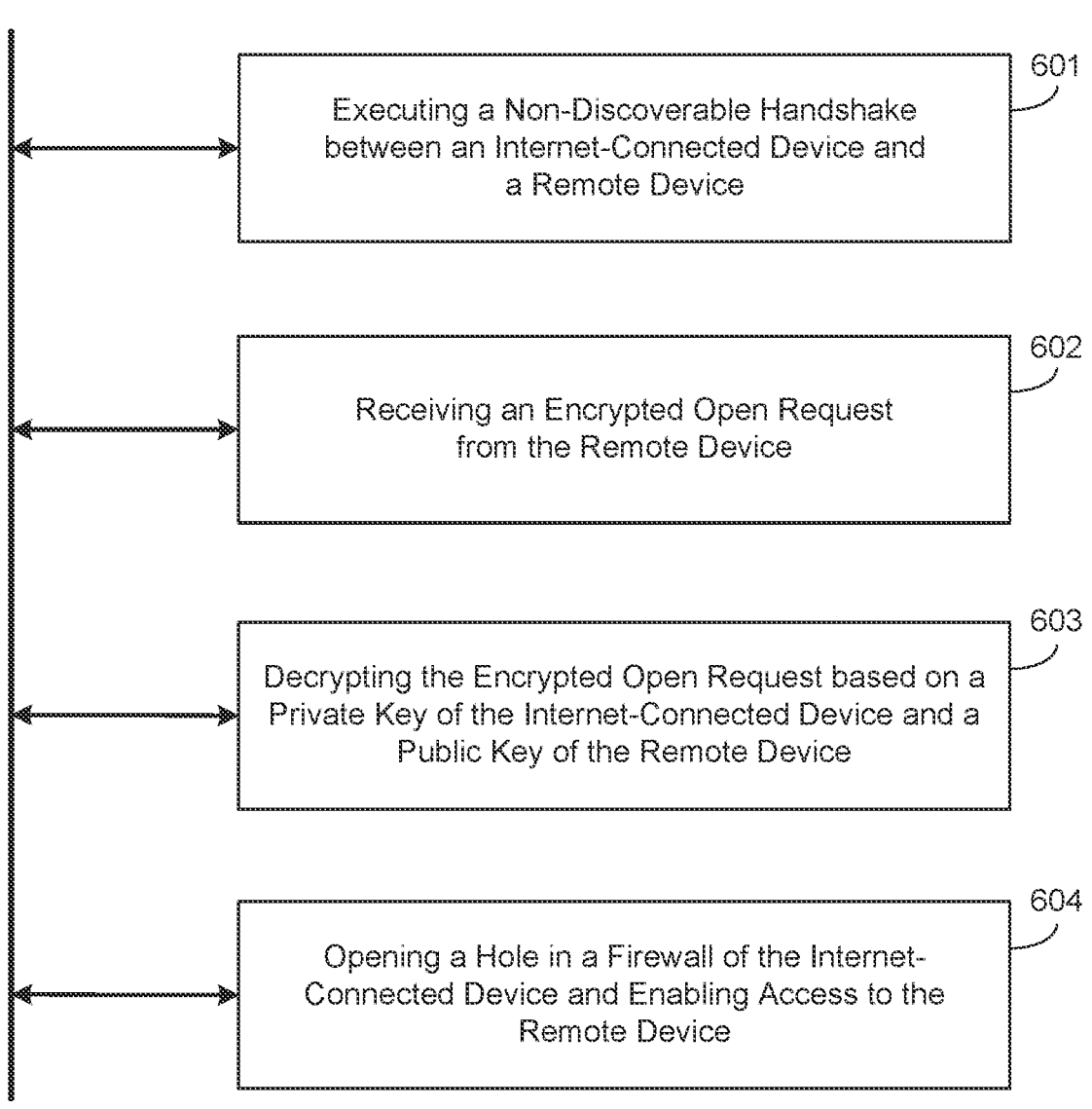

601

Executing a Non-Discoverable Handshake between an Internet-Connected Device and a Remote Device

602

Receiving an Encrypted Open Request from the Remote Device

603

Decrypting the Encrypted Open Request based on a Private Key of the Internet-Connected Device and a Public Key of the Remote Device

604

Opening a Hole in a Firewall of the Internet-Connected Device and Enabling Access to the Remote Device

700

701

Connecting to a LAN
Managed by an Existing Router

702

Scanning the LAN to Obtain IP Addresses
Assigned by the Existing Router to the Existing
Devices of the LAN

703

Detecting the Existing Router has
Disappeared from the LAN

704

Assuming a Role of the Existing Router and
Granting the Existing Devices the Previously-
Assigned IP Addresses

TRANSPARENT REPLACEMENT OF AN INTERNET PROTOCOL NETWORK ROUTER

BACKGROUND

One of the benefits of a router is that it allows for connectivity between different devices and networks. For example, multiple devices can be connected to the Internet and to each other through a single router. In a home environment, a router can connect multiple devices such as laptops, smartphones, tablets, televisions, smart wearables, vehicles, and the like, to the internet and allow them to communicate with each other. In a business environment, routers can be used to connect multiple computers and servers to the Internet and to each other, allowing for seamless communication between employees and users outside the business.

Configurations in networks play a critical role as they keep networks fully functioning and free from downtime. However, managing the configurations of a router typically requires a human (e.g., an admin, etc.) to make changes at regular intervals of time. But a person requires time to update the router, and even then, the person may fail to identify security flaws or make the changes correctly. This can result in downtime for an entire network of devices.

SUMMARY

One example embodiment provides an apparatus that includes one or more of a memory, a plurality of network connection ports, and a processor configured to connect to a local area network (LAN) managed by an existing router, scan the LAN and obtaining Internet Protocol (IP) addresses of existing devices of the LAN which are assigned to the existing devices by the existing router, detect that the existing router has disappeared from the LAN, and in response, assume a role of the existing router and grant the existing devices the IP addresses assigned by the existing router.

Another example embodiment provides a method that includes one or more of connecting to a local area network (LAN) managed by an existing router, scanning the LAN and obtaining Internet Protocol (IP) addresses of existing devices of the LAN which are assigned to the existing devices by the existing router, detecting that the existing router has disappeared from the LAN, and in response to the detecting, assuming a role of the existing router and granting the existing devices the IP addresses assigned by the existing router.

A further example embodiment provides a computer-readable medium comprising instructions, that when read by a processor, cause the processor to perform one or more of connecting to a local area network (LAN) managed by an existing router, scanning the LAN and obtaining Internet Protocol (IP) addresses of existing devices of the LAN which are assigned to the existing devices by the existing router, detecting that the existing router has disappeared from the LAN, and in response to the detecting, assuming a role of the existing router and granting the existing devices the IP addresses assigned by the existing router.

BRIEF DESCRIPTION OF THE DRAWINGS

FIG. 1B is a diagram illustrating components that may be included in a routing apparatus according to example embodiments.

FIGS. 2A-2D are diagrams illustrating a process of automatic detection and configuration of a new virtual local area network (VLAN) according to example embodiments.

FIGS. 3A-3C are diagrams illustrating a process of a remote device directly accessing an Internet-connected device according to example embodiments.

FIGS. 4A-4E are diagrams illustrating a process of transparent replacement of an Internet Protocol (IP) network router according to example embodiments.

FIG. 5 is a diagram illustrating a method of automatically configuring a new VLAN according to example embodiments.

FIG. 6 is a diagram illustrating a method of enabling direct remote access to an Internet-connected device according to example embodiments.

DETAILED DESCRIPTION

Figure 1A:
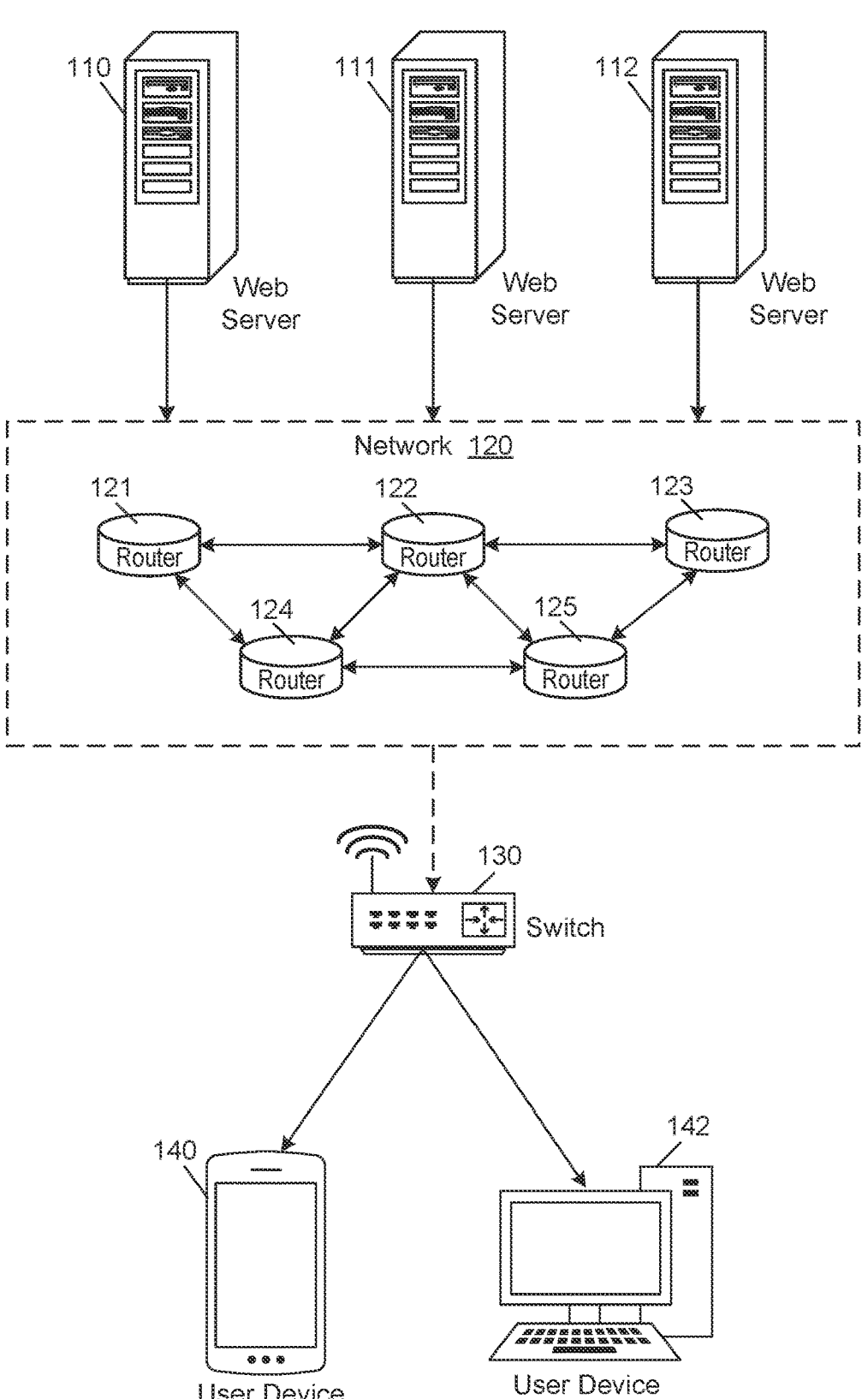
FIG. 1A is a diagram illustrating a network computing environment including a plurality of routing apparatuses according to example embodiments.

It is to be understood that although this disclosure includes a detailed description of cloud computing, implementation of the teachings recited herein is not limited to a cloud computing environment. Rather, embodiments of the instant solution are capable of being implemented in conjunction with any other type of computing environment now known or later developed.

The example embodiments are directed to a routing apparatus (also referred to herein as a router, etc.) The router may be geared for gigabit Internet, and also designed to accommodate future generation speeds. For example, the router may include multiple Ethernet ports that have a 1 Gbps Ethernet capacity or more. The router may enable thousands of connected devices and may collect and store activity data of the connected devices. The router may include a dual-channel memory and may support both Internet Protocol version four (IPv4) which uses a 32-bit address and Internet Protocol version six (IPv6) which uses a 128-bit address. The router can support multiple separate local area networks (LANs) at the same time, may isolate a guest Wireless Fidelity (WiFi) network, and may support multiple virtual LANs (VLANs) with automatic internal mapping. The router may assign each connected device an IP address. The router may perform port forwarding by device name. The router may also support multiple Internet connections for redundancy and load balancing.

The router may include a built-in firewall, and may protect all devices from threat-ware, malware, phishing, ransomware, and viruses. The router may be configured to pause Internet access to any device. Furthermore, the router may be configured to temporarily quarantine a new device when it joins the network. The router may perform content filtering, web search filtering, safe search, intrusion prevention, and the like. The router may also perform automatic virtual private network (VPN) self-configuring, and the like.

According to various embodiments, a router may be configured to automatically configure a new virtual local area network (VLAN) in response to detecting the existence of such a VLAN. In this example, the router may receive a packet from a device that is associated with the new VLAN, and detect an unknown VLAN identifier within an IEEE 802.1q header of the packet. Thus, the router may automatically detect the existence of a new/unknown VLAN with respect to the router. In response, the router may configure a VLAN interface for the new VLAN at the router and deploy the VLAN interface. For example, the router may identify which devices are part of the VLAN, and store attributes of the VLAN at the router for future routing purposes. The process can be performed without a user having to manually detect the new VLAN or configure the new VLAN for the router.

In this case, a router is different from a switch, because a switch must typically assign a VLAN to a specific port and a media access control (MAC) address to the VLAN. This process is usually performed by a user. However, a router is not responsible for such port assignment or MAC assignment. Instead, the router can automatically detect attributes of the VLAN, and store the attributes for future routing.

According to other various embodiments, a router (or other Internet-connected device) may be configured to enable a remote device, such as a user device, to directly access the router and its settings without a proxy (e.g., a cloud provider, etc.) performing authentication. Instead, the router and the remote device may perform a handshake that is not detectable to other devices because the router will not respond to incorrect requests. For example, the router and the remote device may perform a Unit Datagram Protocol (UDP) handshake that involves multiple steps/communications between the router and the remote device. Upon successfully performing the handshake, the router may open a pinhole in the firewall and enable the remote device to remotely configure the router and its settings.

Traditionally, remotely accessing a router and gaining access to the firewall requires the router to be discoverable and exposed on the network. In the present application, the router can remain hidden by including a public key of the router within a software application installed on the remote device. The key may be shared by the router itself, a user, or the like. The router and the remote device may use a previously agreed-upon hashing algorithm to enable hidden discovery of the router from a global Domain Name System (DNS). Here, the router may hash the public key of the router and store its IP address with the hashed public key at the DNS. The remote device may perform the same hash on the public key, and identify the IP address published at the DNS, to obtain access to the router. This process cannot be performed by other network devices with access to the DNS, unless they know the public key and the hashing algorithm.

Furthermore, by performing the handshake between the router and the remote device directly, there is no need for a proxy service, such as a cloud provider to provide a third-party security service for such access. In doing so, the remote device can access the router directly without the need for the cloud. This is beneficial when the cloud provider is down, when the cloud provider is hacked, and the like.

According to various other embodiments, a router may be configured to automatically replace an existing router on an IP network. Here, the existing router may be servicing a number of devices on a local area network (LAN). A new router may connect to the LAN, and may be assigned an IP address from the router, for example, via a DHCP client started by the existing router. The new router may then scan the existing devices on the LAN that are currently being served by the existing router to identify attributes of the existing devices, such as IP addresses, subnet masks, gateways, next hop data, metrics, and the like. In some embodiments, the new router may also communicate with the existing router, but this is not necessary.

The new router may detect when the existing router disappears from the network, for example, by being disconnected, powered down, or the like. In response, the new router may assume the role of the existing router and replace the functionality of the existing router servicing the existing devices on the LAN. Here, the new router may grant the existing devices the same IP addresses and other routing attributes assigned by the old router, thus transparently replacing the existing router without user involvement.

FIG. 1A illustrates a network computing environment 100 including a plurality of routing apparatuses (e.g., routers) according to example embodiments. Referring to FIG. 1A, the network computing environment 100 includes a plurality of web servers that provide content to a plurality of user devices. In this example, a web server 110, a web server 111, and a web server 112 may provide different types of content including emails, videos, chat, social media, video games, and the like, to a user device 140 and a user device 142 via a network of routers 120. In this example, the network of routers 120 includes a router 121, a router 122, a router 123, a router 124, and a router 125. Any of the routers within the network of routers 120 may embody the self-configuring and bitmap management processes described herein.

For example, the web server 110 may send packets of data to the user device 140 via the network of routers 120. In this example, one or more of the routers in the network of routers 120 may receive and route the packets until it reaches the user device 140. For example, a router 121 may receive the packets from the web server 110 and route the packets to the router 124. Here, the router 121 may select/choose the best path for the packets through the network. In response to receiving the packets, the router 124 may then route the packets to a switch 130, which then delivers the packets to the user device 140. The source and destination of the packets may be included in the packets and may be used by the network of routers 120 and the switch 130 to deliver the packet to the appropriate device (the user device 140).

Each of the routers in the network of routers 120 may store a routing table which includes all of the available paths in the network of routers 120. A router may look at the destination IP address in the packet and determine the fastest path through the network of routers 120 based on the routing table and metric values determined by the router. Furthermore, any of the routers within the network of routers 120 may perform the methods and processes described herein. For example, a router may automatically configure a VLAN interface, may enable direct access to a remote device, and/or may transparently replace an existing router on the network without a need for manual configuration.

The example of FIG. 1A could refer to a home environment or the like. It should also be appreciated that the routers described herein may be used in an office environment. In this example, the routers may connect not only user devices, but also other servers, and the like.

Figure 1B:
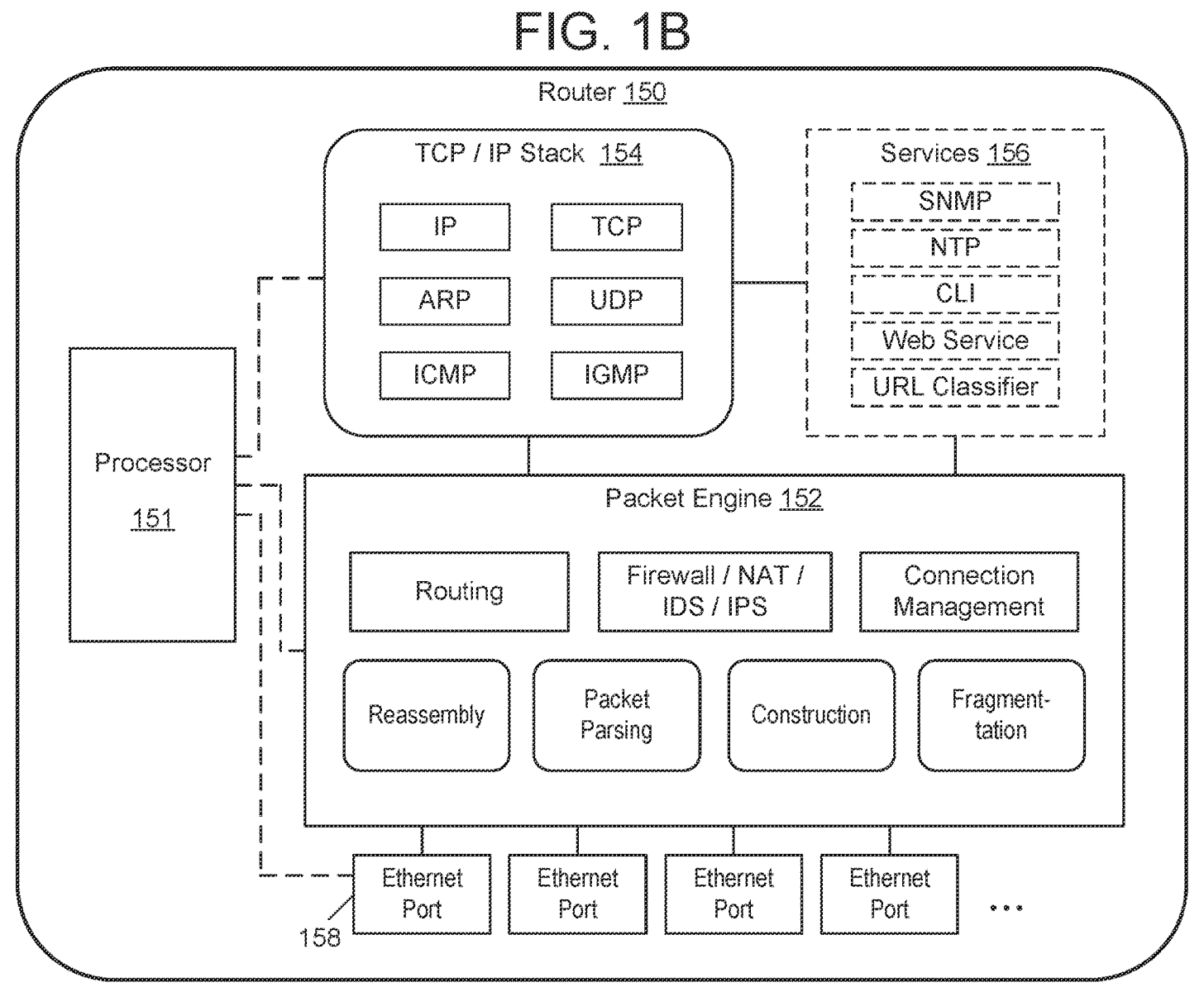

FIG. 1B illustrates components that may be included within a routing apparatus (i.e., a router 150) according to example embodiments. Referring to FIG. 1B, the router 150 includes a processor 151 such as a central processing unit (CPU) that helps each of the other components of the router 150 perform their function. The router 150 also includes a packet engine 152, a transmission protocol/Internet protocol (TCP/IP) stack 154, and a plurality of Ethernet ports 158. In this example, the packet engine 152 is responsible for processing packets as they are received through an ingress port (e.g., an Ethernet port 158) and output via an egress port. The TCP/IP stack 154 is responsible for ensuring that various protocols are enforced on packets from ingress to egress. The packet engine 152 and/or the TCP/IP Stack 154 may perform services 156 on packets that pass through the router 150 including, but not limited to, implementing a Simple Network Management Protocol (SNMP), implementing Network Time Protocol (NTP), providing and managing a command line interface (CLI), managing a web service that is accessible to external devices, and a uniform resource locator (URL) classifier.

According to various embodiments, the packet engine 152 may perform routing on a packet based on a destination IP address of the packet, may implement a firewall, perform network address translation (NAT), perform an intrusion detection system (IDS), perform an intrusion prevention system (IPS), and the like. The packet engine 152 may also perform a connection management function to control automatic failover, monitor client connections, direct requests to appropriate servers, act as a proxy server, handle client/ server communications, and prioritize connections between application servers. The packet engine 152 may also perform reassembly on fragments of a packet as it arrives and apply ACLs and NATs to the packet once it is reassembled, packet parsing, construction, and fragmentation of packets into smaller pieces so that resulting pieces can pass through a link with a smaller maximum transmission unit.

In some embodiments, the packet engine 152 may also manage autoconfiguration for IPV4 which enables devices to connect to the Internet automatically assign themselves an IP address, device management which displays views of router configuration and performance such as to an external device, virtual private networks (VPNs), routing information protocol (RIP), Universal Plug and Play (UPnP) to enable compliant devices to automatically set port forwarding rules, simple service discovery protocol (SSDP) which enables a device to advertise its services to other devices, a Domain Name System (DNS) which enables translation of domain names to machine-readable IP addresses, a hostname cache which can be used by the DNS store hostnames and IP address pairings, category enforcement which enables blocking of categories of DNS, device pause, and the like.

Furthermore, the packet engine 152 may also control and manage dynamic host configuration protocol (DHCP) including DHCP client and DHCP server functions. DHCP can be used to assign IP addresses to DHCP clients and allocate TCP/IP configuration information to DHCP clients. This information includes subnet mask information, default gateway IP addresses, and DNS addresses. In some embodiments, the router 150 may serve as a DHCP server that assigns IP addresses to clients connected to the router 150.

In one embodiment, the system enhances a router's functionality, including intelligent network monitoring and security features. The router's processor is augmented with advanced algorithms for analyzing network traffic patterns and detecting anomalous behavior indicative of cyber threats. Upon detecting such threats, the router autonomously takes preventive actions, such as blocking suspicious incoming connections or isolating compromised devices from the network. Additionally, the router implements machine learning models to refine its threat detection capabilities based on real-time data continually. Messages exchanged between components include alerts sent from the packet engine to the processor indicating potential security breaches and instructions from the processor to the packet engine to implement firewall rules or traffic filtering mechanisms in response to detected threats.

In one embodiment, an apparatus enables seamless router failover. The apparatus comprises memory, a plurality of network connection ports, and a processor configured to connect to a local area network (LAN) managed by an existing router. The apparatus scans the LAN, obtains Internet Protocol (IP) addresses of existing devices assigned by the existing router, detects the disappearance of the existing router from the LAN, and assumes the role of the existing router, granting the existing devices the IP addresses assigned by the existing router. Instructions for the processor to execute the functionalities described are stored in memory. Upon initialization, the processor establishes communication with the LAN through one of the network connection ports. It initiates a scanning process within the LAN, broadcasting messages to identify active devices and retrieve their IP addresses. Once the scan is complete, the processor compares the obtained IP addresses with those previously assigned by the existing router, facilitating the detection of any discrepancies or inconsistencies. If the existing router is no longer detected within the LAN, the processor interprets this as the disappearance of the existing router and proceeds to execute failover procedures. In response, the processor sends ARP (Address Resolution Protocol) messages to update the ARP cache of connected devices, informing them of the new router's MAC address corresponding to the IP addresses they were previously assigned. Additionally, the processor may broadcast DHCP (Dynamic Host Configuration Protocol) messages to renew IP leases for connected devices, ensuring uninterrupted network connectivity.

FIGS. 2A-2D illustrate a process of automatic detection and configuration of a new virtual local area network (VLAN) according to example embodiments. A local area network (LAN) is a group of computers (e.g., within an office, on a campus, in the same building, etc.) which share a same/common physical network. Computing devices on the LAN connect to the same switch directly or indirectly (e.g., via a wireless access point (AP), etc.) Meanwhile, a VLAN is a logical overlay that groups together a subset of devices that share the same physical LAN thereby isolating the traffic for the subset of devices from the rest of the devices on the LAN.

Typically, a VLAN is configured by a user (e.g., an administrator, etc.) through the network switch. To perform the configuration, the user assigns a new VLAN to a port on the switch. VLANs can be used to partition a single switched network into a set of overlaid virtual networks that can provide different functional and security requirements. This partitioning avoids the need to have multiple, distinct physical networks for different use cases.

A VLAN is uniquely identified on a LAN using a VLAN ID. Each port on a switch can have one or more VLAN IDs assigned to it. A VLAN ID is translated to a VLAN tag, which is a 12-bit field in header data of an Ethernet frame sent to that VLAN. VLAN tagging is defined by the Institute of Electronics Engineers (IEEE) in the 802.1Q standard. Typically, when an Ethernet frame is received from an attached host, it has no VLAN tag. The switch typically adds the VLAN tag. In a static VLAN, the switch inserts the tag associated with the ingress port's VLAN ID. In a dynamic VLAN, it inserts the tag associated with that device's ID or the type of traffic it generates.

According to various embodiments, a router that services a LAN can detect when a new VLAN has been created, and can automatically configure a VLAN interface (e.g., a virtual construct) for the VLAN at the router. The VLAN interface includes information about a routing path of the VLAN. This process includes updating the router with information about the VLAN such as a link state, a type of interface, an IP address, an amount of bytes that are sent and received, etc. Because the router automatically configures the VLAN interface for the new VLAN, no user involvement is necessary to perform the configuration.

Figure 2A:
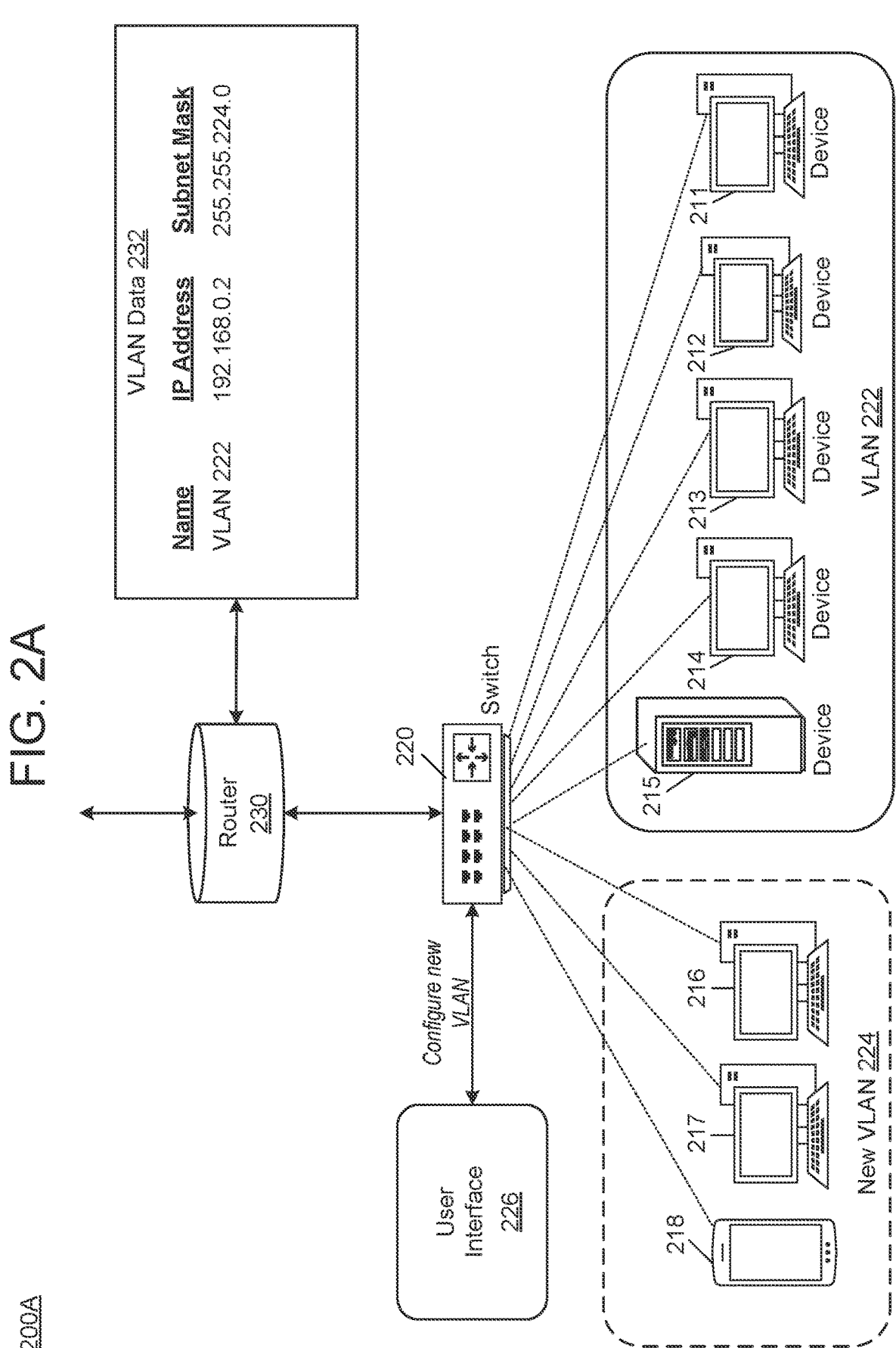

FIG. 2A illustrates a LAN computing environment 200A that includes a plurality of devices that are connected to a same physical LAN through a network switch 220. For example, a device 211, a device 212, a device 213, a device 214, a device 215, a device 216, a device 217, and a device 218 share a same physical LAN via the network switch 220. In this example, a VLAN 222 has previously been established via the network switch 220 for a subset of the devices including the device 211, the device 212, the device 213, the device 214, and the device 215. In this example, traffic from the switch is routed to a router 230 which forwards the traffic to another network, the Internet, etc. Here, the router 230 has an existing VLAN interface for the VLAN 222 stored within a table 232 of the router 230.

According to various embodiments, an administrator may configure a new VLAN 224 via the network switch 220. For example, the network switch 220 may provide a user interface 226 that is displayed on an administrative device such as a server, a user device, or the like, which is connected to the network switch 220. The user may enter commands via the user interface 226 causing the network switch to generate a new VLAN 224 that isolates a subset of devices from the physical LAN. In this case, the new VLAN 224 is configured and includes the device 216, the device 217, and the device 218. Once operating, the devices on the new VLAN 224 may send and receive traffic (e.g., packets, etc.) via the network switch 220 and the router 230. The router 230 may receive the packets from the network switch 220 and forward them to a next hop on the Internet or another network such as a LAN, etc.

FIG. 2B illustrates a process 200B of the router 230 receiving an outgoing packet 240 transmitted by the device 218 through the network switch 220. Here, the router 230 may examine the packet 240, and detect that a new VLAN has been established (i.e., the new VLAN 224). In response, the router 230 may automatically configure a VLAN interface for the new VLAN 224 at the router 230. The packet 240 is a formatted unit of data carried by a packet-switched network. The packet 240 contains control information and user data, such as a payload.

Figure 2C:
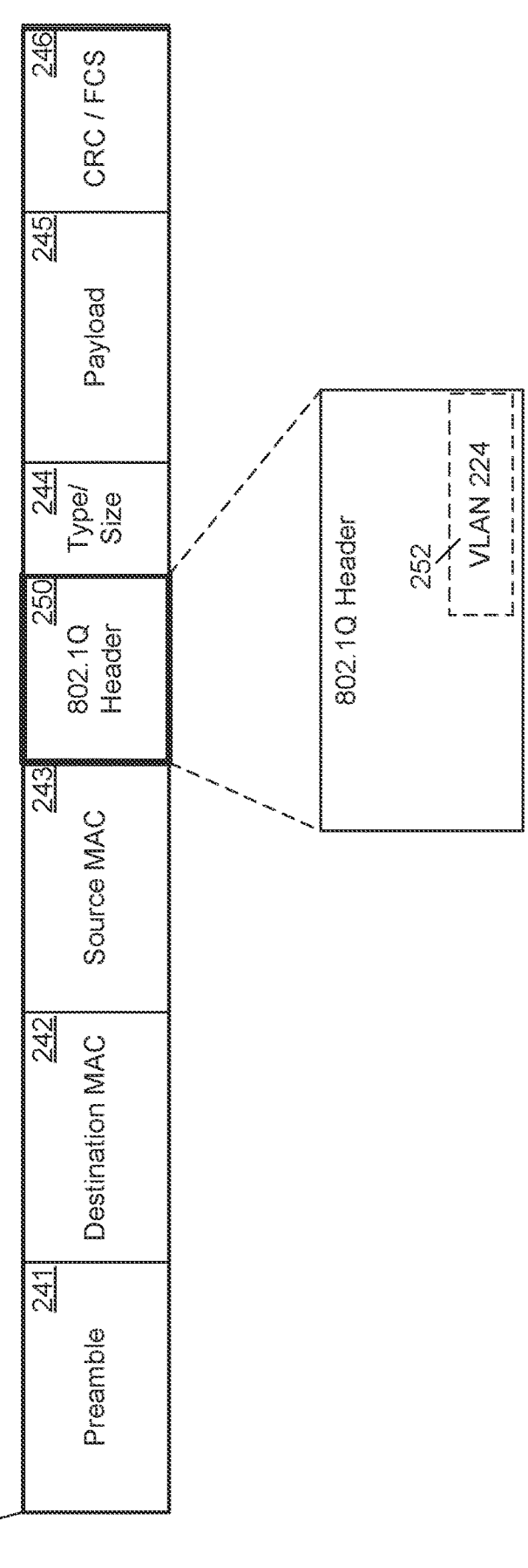

FIG. 2C illustrates a detailed view of the packet 240 that is transmitted in the example of FIG. 2B. Referring to FIG. 2C, the packet 240 contains a preamble 241 which is a starting field with an alert and timing pulse for transmission, a destination MAC address 242 of a destination station(s), a source MAC address 243 of a sending station(s), a 802.1Q header 250, a type 244 with the length of the data field, a payload 245 which includes the data, and a cyclic redundancy check (CRC) or Frame Sequence Check (FSC) field for error checking, referred to as CRC/FCS 246.

According to various embodiments, the 802.1Q header 250 contains a VLAN identifier field 252, as shown in FIG. 2C. The router 230 (shown in FIG. 2B) may analyze the VLAN identifier field 252 to identify the VLAN from where the packet 240 is from. In this example, the VLAN identifier field 252 identifies the new VLAN 224. In response to receiving a new VLAN identifier in the VLAN identifier field 252, the router is able to automatically generate a VLAN interface for the new VLAN 224, as shown in FIG. 2D.

Figure 2D:
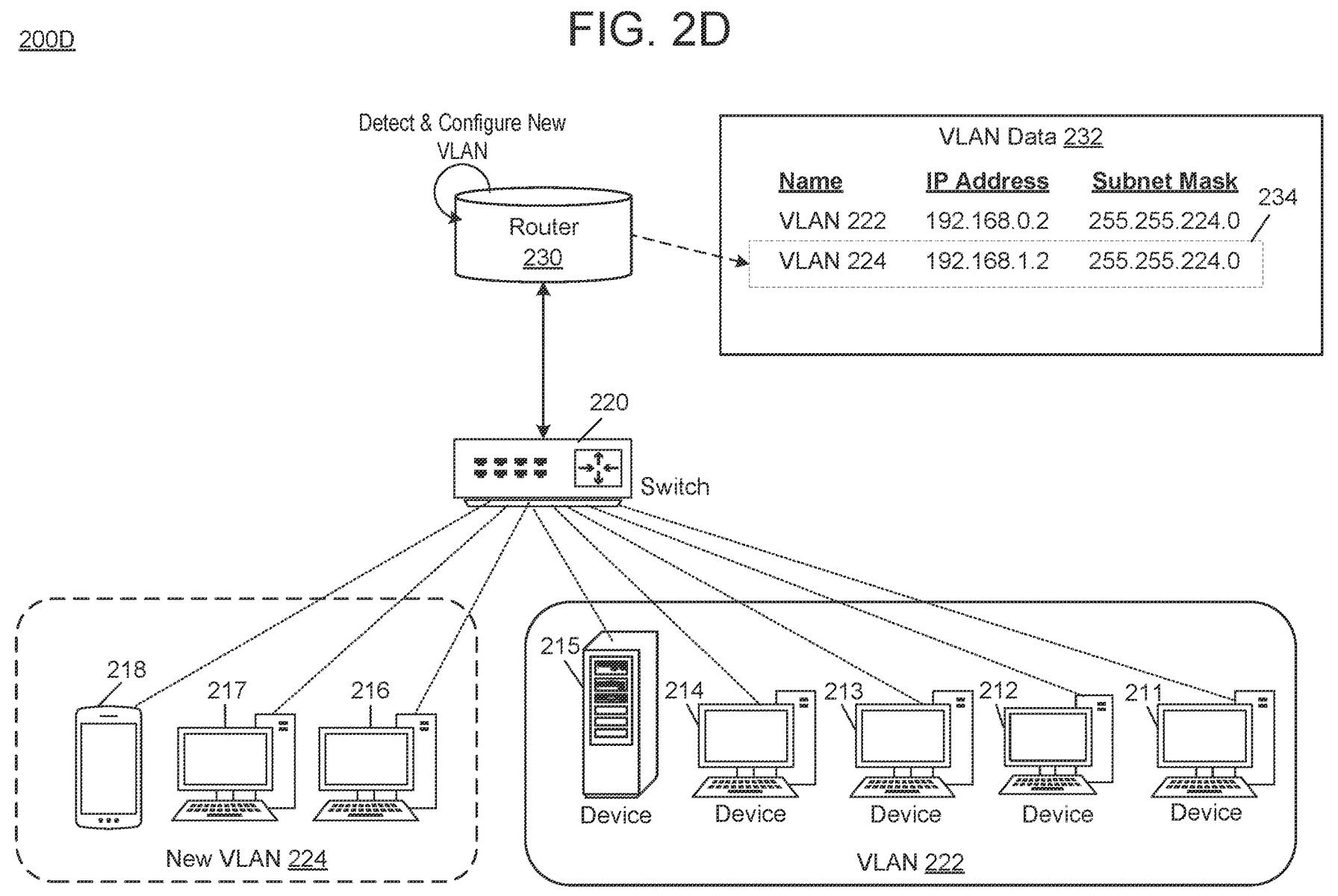

For example, FIG. 2D illustrates a process 200D of the router 230 automatically configuring a VLAN interface for the new VLAN 224. Here, the router 230 may store VLAN data within a table 232. In this example, the router 230 may create a new entry 234 for the new VLAN 224 which includes information about the link state, the IP address, the name (VLAN identifier, etc.), a subnet mask, and the like, of the new VLAN 224. This information can be obtained from the packet 240 shown in FIG. 2C and recorded by the router 230. According to various embodiments, the router 230 may generate a virtual construct for the new VLAN 224 that ensures correct routing of traffic to and from the new VLAN 224 via the router 230. This process is performed in an automated manner by the router 230 without user involvement.

Figure 3C:
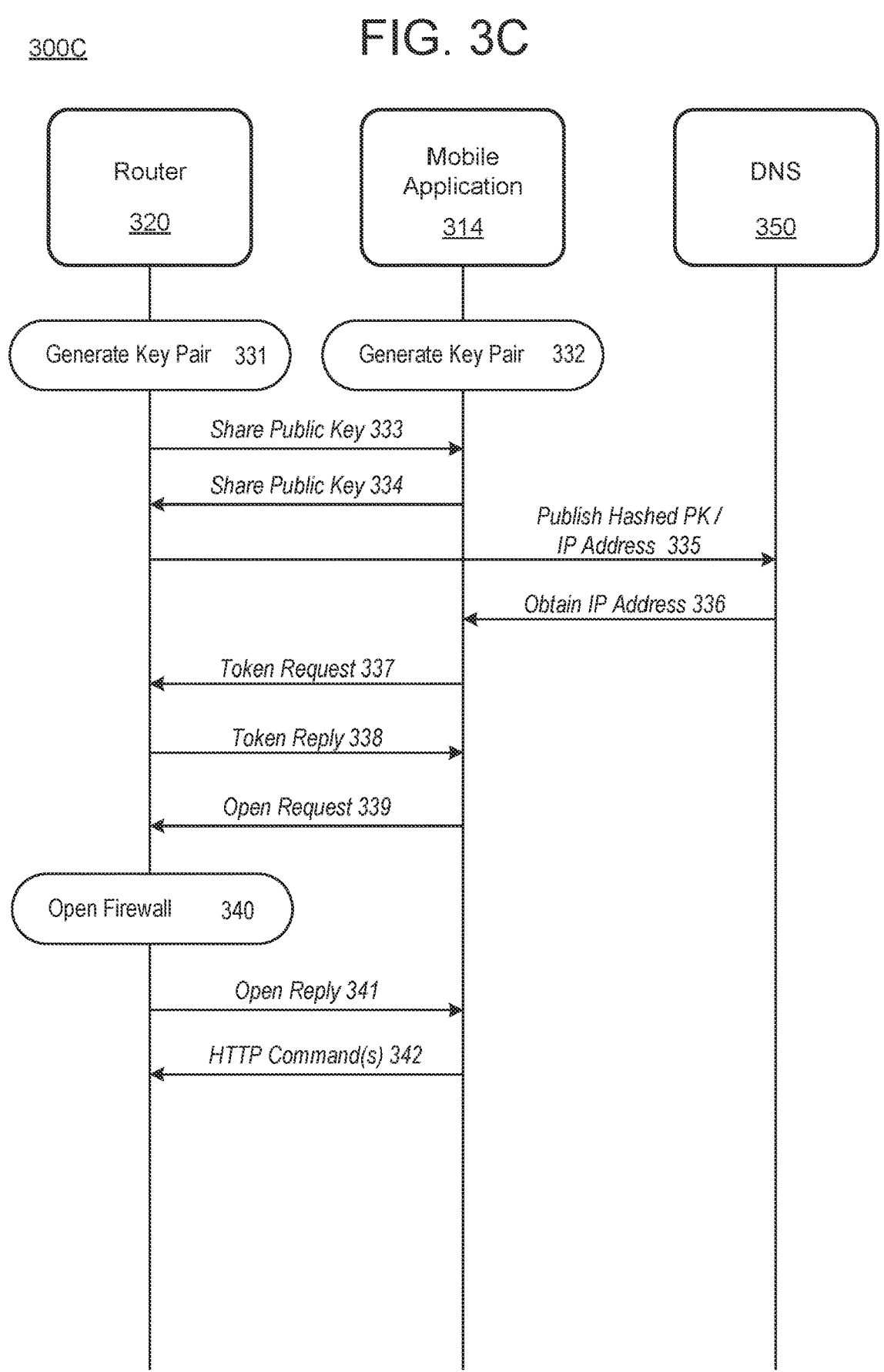

FIGS. 3A-3C illustrate a process of a remote device directly accessing an Internet-connected device according to example embodiments. For example, FIG. 3A illustrates a process 300A of a non-discoverable handshake between a router 320 and a remote device 310, and FIG. 3B illustrates a process 300B of the router 320 opening a pinhole in a firewall 324 to enable the remote device 310 access to configuration settings.

According to various embodiments, an Internet-connected device such as a router 320 (shown in FIG. 3A), or another type of network device such as a switch, a hub, a gateway, or the like, may allow a remote device, such as a remote device 310 shown in FIG. 3A, to access settings thereof through a firewall 324 of the router 320. In this example, the remote device 310 includes a mobile application 314 which can be displayed on a user interface 312 of the remote device 310 and used to remotely configure or otherwise modify router settings 326 of the router 320. For example, a user may enter commands via the user interface 312 into the mobile application 314. In some embodiments, the mobile application 314 may be downloaded from an application marketplace and installed on the remote device 310. In this example, the router 320 includes multiple Ethernet ports that receive and route network traffic to and from devices on a network. The router settings 326 may be used to configure the Ethernet ports, the routes, the links, and the like.

Traditionally, in order to access and modify the router settings of a router, a proxy service such as a cloud service must provide the security/authentication of the remote device 310. In contrast, in the example embodiments, the remote device 310 can be directly connected to the router 320 and access the router settings 326. For example, the router 320 (e.g., via a processor 322) may perform a non-discoverable handshake between the router 320 and the mobile application 314 installed on the remote device 310 to authenticate the remote device 310. The handshake process is further described with respect to FIG. 3C.

The non-discoverable handshake may be performed via a User Datagram Protocol (UDP). The non-discoverable nature of the handshake is generated because the router 320 does not respond to unauthorized requests. As a result, the router 320 does not disclose its existence to unauthorized devices. Instead, the router 320 will only respond to valid authentication requests. Thus, the handshake is considered "non-discoverable" to network devices that are not authorized to connect to the router 320.

When the handshake is successful, the processor 322 may open a pinhole in the firewall 324 as shown in FIG. 3B. According to various embodiments, with the firewall 324 open, the mobile application 314 may send commands to the router 320 (e.g., via the processor 322), to remotely configure the router settings 326. The commands that may be sent may be hypertext transfer protocol secure (HTTPS) commands that configure the router settings 326.

FIG. 3C illustrates a process 300C of performing a multi-step handshake between the router 320, the remote device 310, and a Domain Name System (DNS) 350. Referring to FIG. 3C, the router 320 generates a symmetric key pair in 331 including a private key and a public key. Likewise, the mobile application 314 generates its own symmetric key pair in 332 including a private key and a public key. Here, the router 320 may share its public key with the mobile application 314 in 333, and the mobile application 314 may share its public key with the router 320 in 334.

Furthermore, in 335, the router may generate a hash of its public key using a predefined hash algorithm and publish the hashed public key with the DNS 350. Here, the predefined hash algorithm is also known to the mobile application 314. The mobile application 314 may compute the same hash of the public key and locate the IP address of the invention using a DNS lookup at the DNS 350 in 336. In 337, the mobile application may transmit a UDP packet that is encrypted using its own private key and the router's public key. This packet is referred to as a Token Request. The router 320 receives the Token Request and, in response, the router decrypts Token Request (encrypted packet) using its own private key and the public key of the mobile application 314. If it does not decrypt successfully, then the packet is discarded. Otherwise, the Token Request is accepted.

If accepted, in 338, the router 320 creates an opaque token (e.g., a random number, time-based value, etc.) and encrypts it with its private key and the public key of the mobile application 314, and sends a response back to the mobile application 314. The response is referred to as a Token Reply. The router 320 also records this token for future reference. The mobile application 314 receives the Token Reply and decrypts it using its own private key and the router's public key. The app then re-encrypts the token using its private key and router's public key and transmits this packet back to the router 320, in 339. This packet is referred to as an Open Request.

In this example, the router 320 receives the Open Request and decrypts it with its own private key and the app's known public key, in order to obtain the token. If the token does not match what was sent in 338, the packet is discarded. If the token is valid and has not expired, the specific IP address of the mobile application 314 is given access to the router settings in 340. Here, the router opens the firewall and allows the mobile application 314 access. In this case, the router 320 creates and transmits a response in 341 which is encrypted with its private key and the public key of the mobile application 314. This is called an Open Reply. The mobile application 314 receives the Open Reply and decrypts it with its own private key and the router's public key. If it decrypts successfully, then the mobile application may proceed with further communications. As such, in 342, the mobile application 314 may send commands to control the router settings. As an example, the mobile application 314 may send HTTPS commands directly to the router 320.

By using UDP protocol for the handshake sequence in the examples of FIGS. 3A-3C, the router is not fundamentally discoverable on the Internet (and is referred to here as non-discoverable). This is because the router will not respond at all to a packet which is not properly encrypted. The token exchange process prevents a replay attack. Without the token sequence, any attacker that can observe a legitimate mobile application sending a request to the router could simply replay the observed packet to impersonate the mobile application. By requiring the mobile application to decrypt and re-encrypt the token, it can be validated that the mobile application does, in fact, know the public key of the router, and that the router knows the mobile application's public key.

In these examples, the router enables the mobile application to access and manage the router via the Internet in a direct communication sequence without any intervening proxy or cloud service. But the process is not limited to a router, and it could be implemented on any Internet-connected device that requires remote access. The router implements a secure handshake process using public key cryptography and a "silent" protocol (in this case, UDP, but it's not limited to that). In contrast, if a streaming protocol such as TCP were to be used, an improperly encrypted packet sent to the router will elicit a response (e.g., a TCP SYN must generate a TCP SYN+ACK response in order to make the connection) thus divulging the existence of the router. However, because the router and the mobile application according to various embodiments rely on UDP, if a non-authentic packet is sent to the router, it's merely ignored, and the existence of the router cannot be determined. Further, a two-part handshake prevents replay attacks.

Figure 4A:
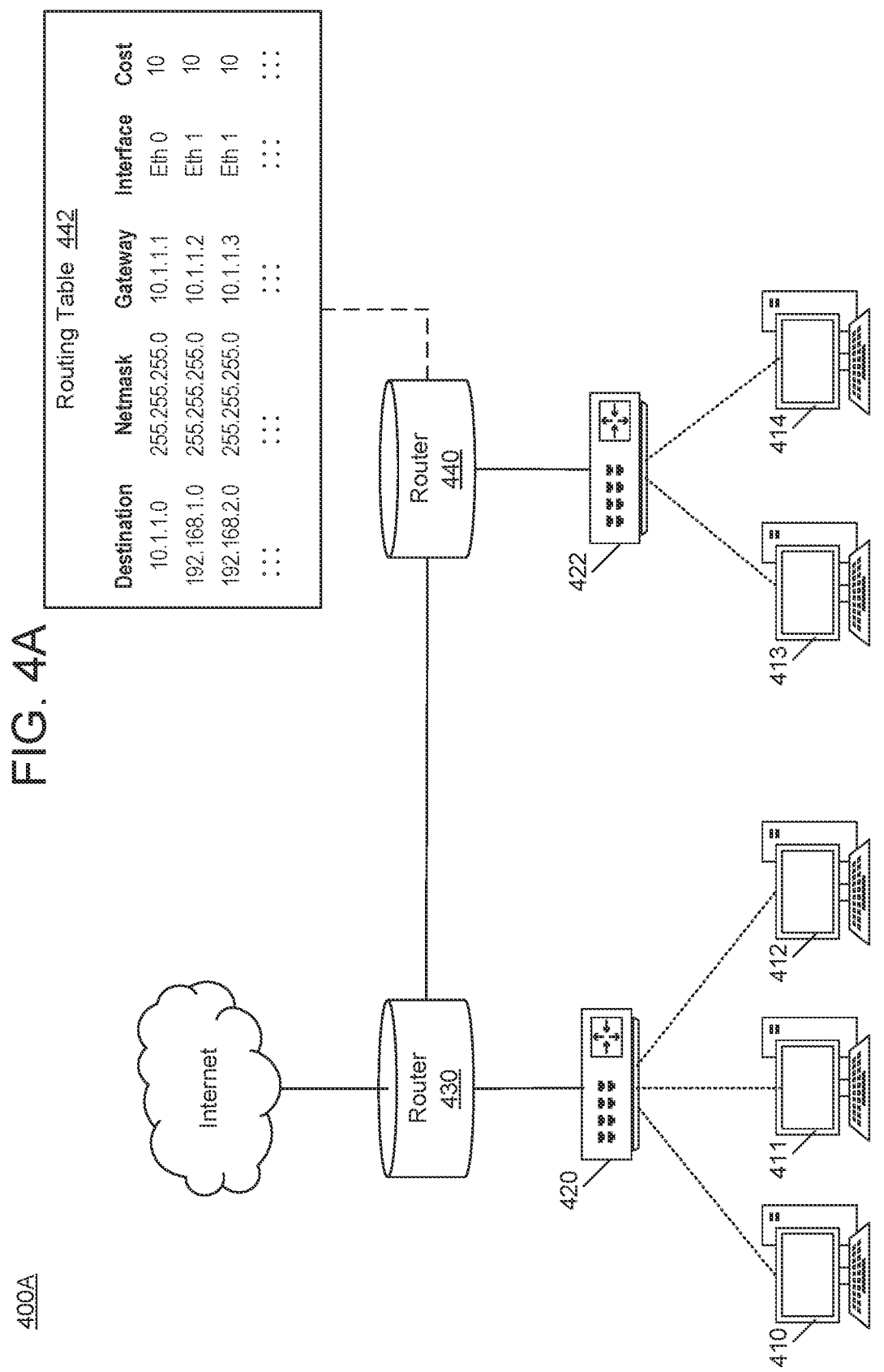

FIGS. 4A-4E illustrate a process of transparent replacement of an Internet Protocol (IP) network router according to example embodiments. For example, FIG. 4A illustrates a computing environment 400A of a network that includes a user device 410, a device 411, and a device 412 managed by a switch 420, and a device 413 and a device 414 managed by a switch 422. Here, the switch 420 manages a first local area network (LAN) and is connected to a router 430, which provides access to the Internet. Meanwhile, the switch 422 manages a second LAN and is connected to a router 440 which transfers data to the Internet through the router 430. This setup is just an example, and it should be appreciated that the example embodiments are not limited to any particular network setup.

Here, the router 440 builds a routing table 442 which includes routing attributes of the devices (e.g., the switch 420, the device 413, and the device 414) which are disposed on the LAN that is managed by the router 440. The routing table 442 includes a destination MAC address, a source MAC address, a gateway, an interface, and a metric value for each device. According to various embodiments, any router may be transparently replaced. Typically, to replace a router with a new router requires a user (admin) to configure the settings of the new router before unplugging the old router. In contrast, in the example embodiments, a new router can transparently detect its settings while the old router is still on the network. Thus, when the old router disappears from the network, the new router can seamlessly assume the role of the old router.

Figure 4B:
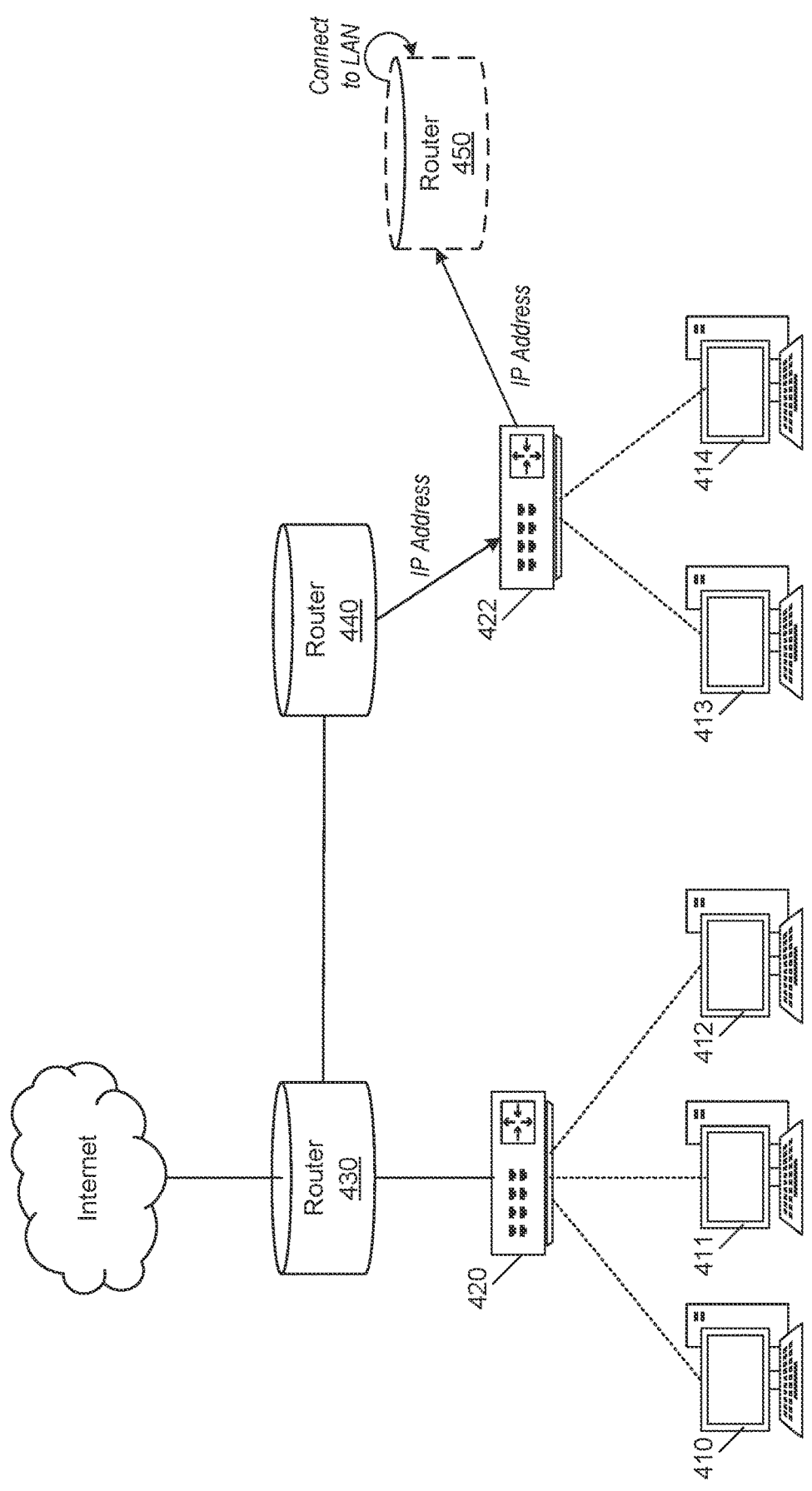

FIG. 4B illustrates a process 400B of a new router 450 being connected to a local area network (LAN) hosted by the router 440. In this example, the new router 450 is connected to the same LAN as the old router 440, and it can therefore discover the existence of the old router 440. For example, the new router 450 may obtain an IP address from a DHCP client that is started by the router 440. The new router may then obtain the IP addressing scheme and discover the other network devices on the LAN. Here, the new router 450 may request an IP address via DHCP, as if it is a normal client on the LAN. The router 440 may supply the new router 450 with an IP address and additional information such as the default gateway. This information can be used by the new router in the transparent replacement of old router.

FIG. 4C illustrates a process 400C of the new router 450 scanning the network for existing devices that are served by the router 440. For example, the new router 450 can send out requests based on its IP address, to learn the IP address of all other network devices. An example of the scanning process is an address resolution protocol (ARP) scan, or the like. In response, the existing devices may respond to the new router 450 with routing information. Here, the new router 450 may build a routing table 452, as shown in FIG. 4C. The existing devices may provide their IP addresses, mask (or prefix length), default gateway (e.g., the IP of the old router), and additional information such as DNS server. All of this information may be stored within the routing table 452 of the new router 450. Through this process, the new router 450 may also learn the numbering scheme used by the router 440 when assigning new IP addresses.

Figure 4D:
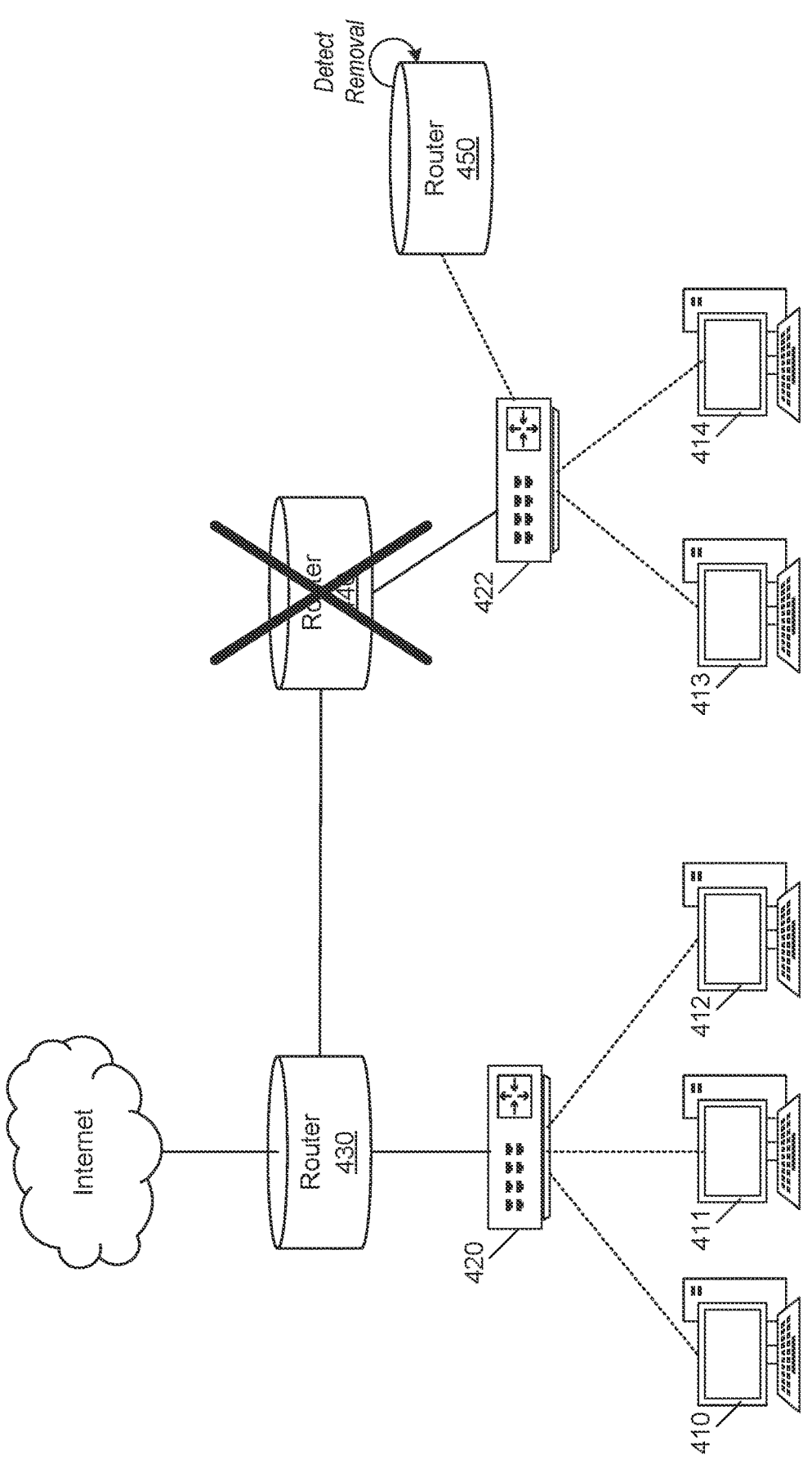
Figure 4E:
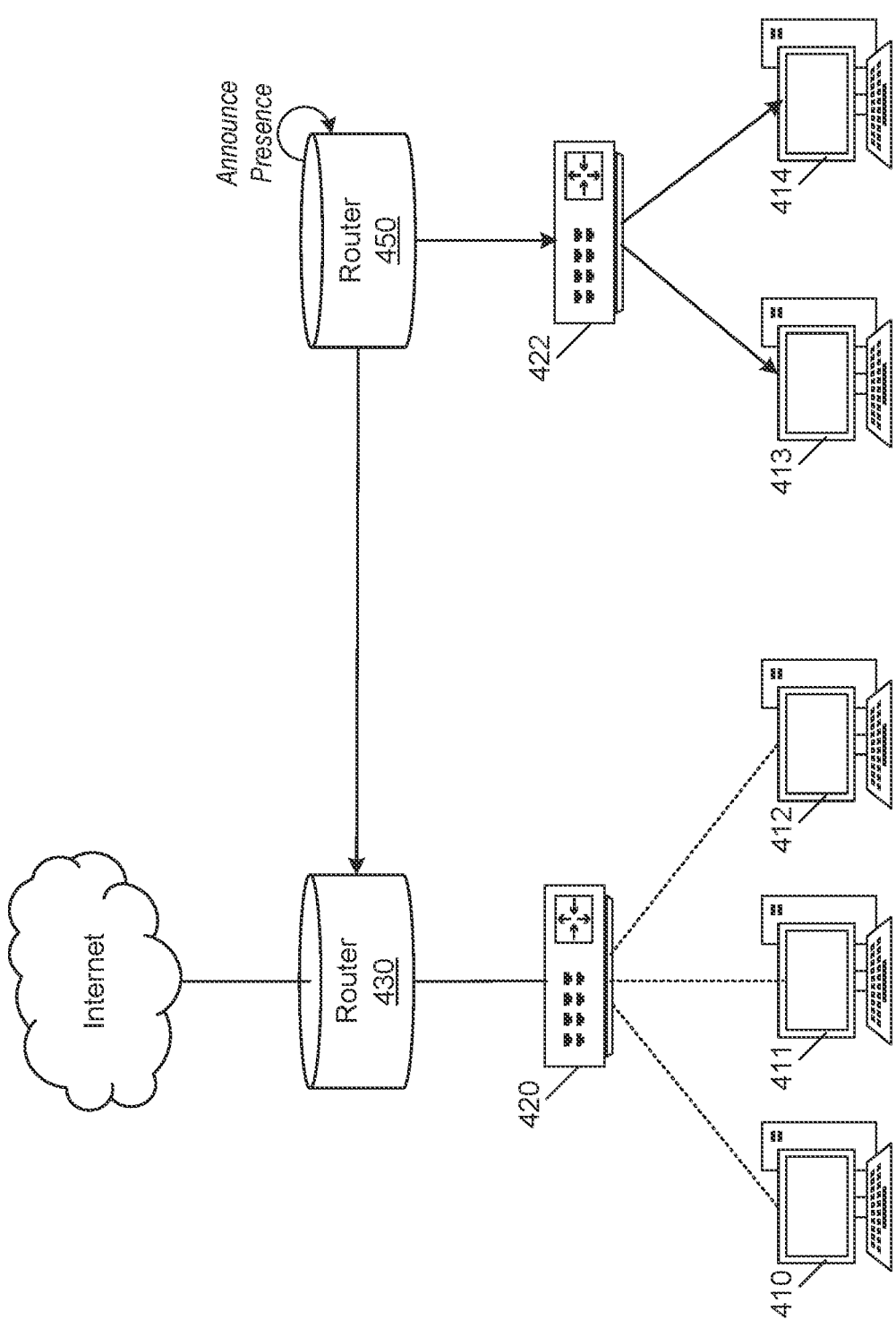

FIG. 4D illustrates a process 400D of the new router 450 detecting the disappearance of the router 440 from the network, and FIG. 4E illustrates a process 400E of the new router 450 assuming the role of the router 440 that is no longer on the network. For example, in FIG. 4D, the router 440 may be disconnected, turned off, shut down, or even remotely powered down. In response, the new router 450 may detect the disappearance of the router 440 from the network, for example, the new router 450 may send an ARP request every few seconds and, upon receiving no reply after a preset number of attempts, the existing router is deemed to have been removed from the network.

In response, the new router 450 may assume the role of the router 440 as shown in the example of FIG. 4E. For example, the new router 450 may send an ARP announcement to the existing devices on the network (switch 412, device 413, and device 414) and automatically assign the existing devices the IP addresses they previous received from the router 440. Furthermore, the new router 450 may maintain the existing routes of the existing devices using the routing table 452 that is generated while the new router 450 is on the network with the old router 440. Furthermore, if a new device connects to the network after the router 440 has disappeared, the new router 450 may assign an IP address to the new device based on the numbering schemed used by the router 440.

The example embodiments allow a router to be replaced while maintaining the same numbering scheme so as to minimize disruption. The new router will send an ARP to announce its presence, which should update the cache on all network devices. Even if it doesn't, when a device on the network needs to find the router, they will send an ARP probe for the router's IP address and the new router will answer.

FIG. 5 illustrates a method 500 of automatically configuring a new VLAN according to example embodiments. For example, the method 500 may be performed by a router shown in any of the examples herein. Referring to FIG. 5, in 501, the method may include establishing a connection with a local area network (LAN) network via a routing apparatus comprising a plurality of network connection ports. In 502, the method may include receiving a packet via a network connection port from among the plurality of network connections ports. In 503, the method may include detecting that the packet is of a new virtual local area network (VLAN). In 504, the method may include automatically configuring a VLAN interface for the new VLAN and deploying the VLAN interface at the routing apparatus.

In some embodiments, the detecting may include detecting that an Institute of Electrical and Electronics Engineers (IEEE) 802.1q header within the packet contains a new VLAN identifier based on a list of existing VLAN identifiers stored by the routing apparatus. In some embodiments, the method may further include verifying that the network connection port is enabled for automatic VLAN configuration prior to automatically configuring the VLAN interface for the new VLAN, In some embodiments, the automatically configuring may include automatically assigning the VLAN to an Internet Protocol (IP) address and to the network connection port via the routing apparatus.

In some embodiments, the automatically configuring may include assigning the VLAN to a media access control (MAC) address via the routing apparatus. In some embodiments, the automatically configuring may include selecting a primary link and a secondary link from among a plurality of links and assigning the primary link and the secondary link to the VLAN. In some embodiments, the method may further include determining that a different network connection port from among the plurality of network connection ports is connected to a LAN and disabling automatic VLAN configuration at the different network connection port in response.

FIG. 6 illustrates a method 600 of enabling direct remote access to an Internet-connected device according to example embodiments. For example, the method 600 may be performed by a router shown in any of the examples herein, or any other Internet-connected device such as a switch, hub, etc. Referring to FIG. 6, in 601, the method may include executing a non-discoverable handshake between an Internet-connected device and a remote device to authenticate the remote device. In 602, the method may include receiving an encrypted open request from the remote device. In 603, the method may include decrypting the encrypted open request based on a private key of the Internet-connected device and a public key of the remote device. In 604, the method may include opening a hole in a firewall of the Internet-connected device and enabling access to the Internet-connected device based on the decrypted open request.

In some embodiments, the executing may include executing the non-discoverable handshake via a User Datagram Protocol (UDP). In some embodiments, the method may further include hashing a name of the Internet-connected device and publishing the hashed name with an IP address of the Internet-connected device with a Domain Name System (DNS). In some embodiments, the executing may include receiving an encrypted token request from the remote device and decrypting the encrypted token request based on the private key of the Internet-connected device and the public key of the remote device. In some embodiments, the executing may further include creating a reply token, encrypting the reply token with the private key of the Internet-connected device and the public key of the remote device, and transmitting the encrypted reply token to the remote device.

In some embodiments, the Internet-connected device may include a router and the remote device may include a software application installed on the remote device, and the executing the non-discoverable handshake may include executing the non-discoverable handshake between the router and the software application installed on the remote device. In some embodiments, the method may further include receiving hypertext transfer protocol secure (HTTPS) commands via the hole in the firewall and configuring one or more settings of the Internet-connected device based on the HTTPS commands. In some embodiments, the method may further include creating the private key of the Internet-connected device and a public key of the Internet-connected device and sharing the public key of the Internet-connected device with the remote device prior to executing the non-discoverable handshake.

Figure 7:
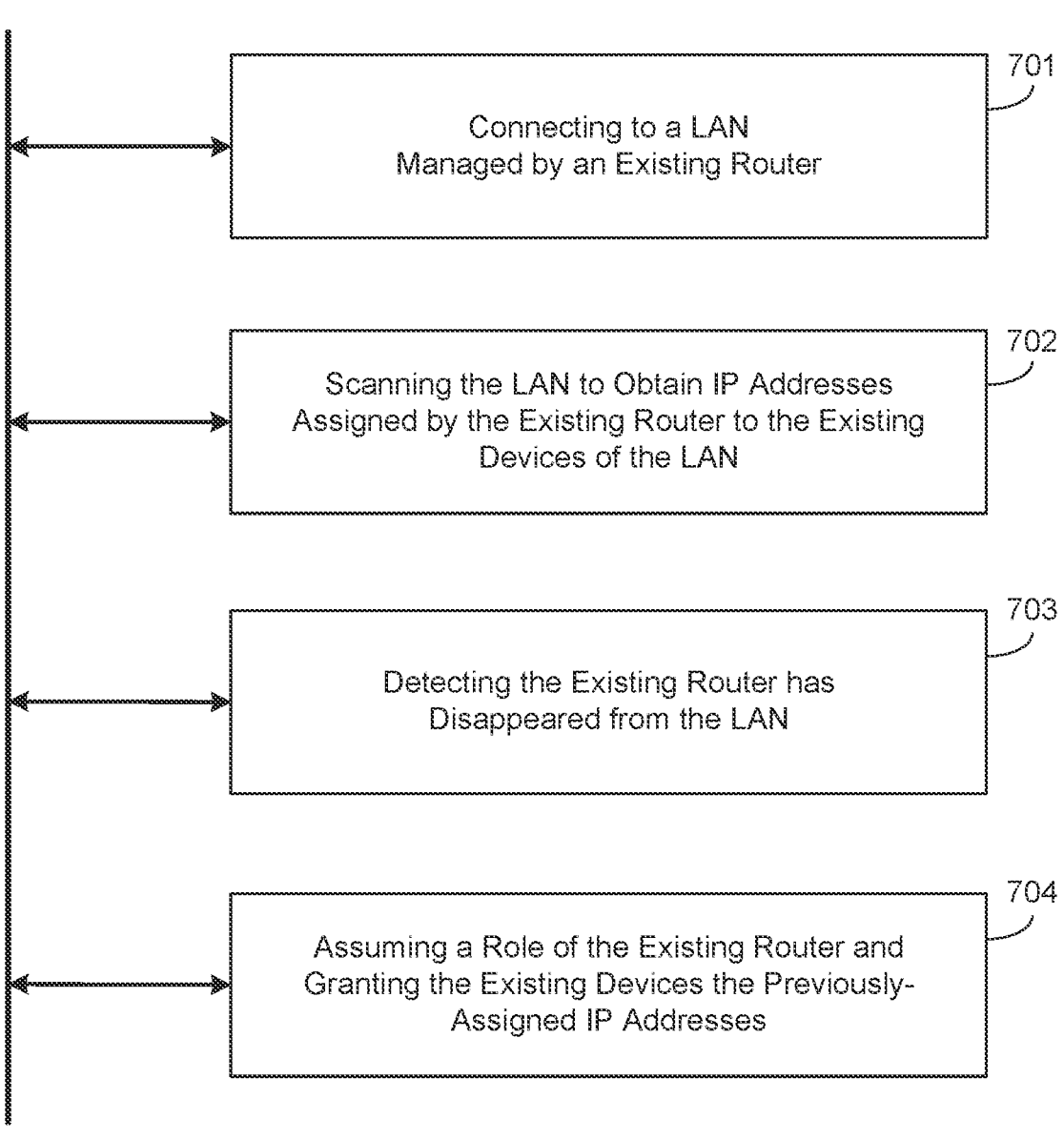
FIG. 7 is a diagram illustrating a method of automatically replacing a network router according to example embodiments.

FIG. 7 illustrates a method 700 of automatically replacing a network router according to example embodiments. For example, the method 700 may be performed the router shown in any of the examples herein. Referring to FIG. 7, in 701, the method may include connecting to a local area network (LAN) managed by an existing router. In 702, the method may include scanning the LAN and obtaining Internet Protocol (IP) addresses of existing devices of the LAN which are assigned to the existing devices by the existing route. In 703, the method may include detecting that the existing router has disappeared from the LAN. In response to the detecting, in 704 the method may include assuming a role of the existing router and granting the existing devices the IP addresses assigned by the existing router.

In some embodiments, the scanning may further include scanning the LAN for a mask, a default gateway, an IP address of the existing router, and a Domain Name System (DNS). In some embodiments, the assuming the role of the existing router may include enabling the mask, the default gateway, and the DNS for the existing devices of the LAN. In some embodiments, the connecting may include receiving an Internet Protocol (IP) address from the existing router via a dynamic host configuration protocol (DHCP) client and the scanning may include scanning the LAN based on the IP address.

In some embodiments, the scanning may include performing an Address Resolution Protocol (ARP) scan of the LAN to discover and identify the existing devices of the LAN. In some embodiments, the assuming the role of the existing router may include transmitting an Address Resolution Protocol (ARP) announcement to the existing devices which announces a presence of a new router. In some embodiments, the scanning may include scanning the LAN to identify a network numbering schema of the existing router and assigning a new IP address to a newly connected device based on the network numbering schema after assuming the role of the existing router.

The above embodiments may be implemented in hardware, in a computer program executed by a processor, in firmware, or in a combination of the above. A computer program may be embodied on a non-transitory computer-readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of non-transitory storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of at least one of an apparatus, a method, and a computer-readable medium has been illustrated in the accompanying drawings and described in the foregoing detailed description, it will be understood that the application is not limited to the embodiments disclosed but is capable of numerous rearrangements, modifications, and substitutions as set forth and defined by the following claims. For example, the capabilities of the routing apparatus shown and described with respect to various figures can be performed by one or more processors of the routing apparatus, or other components.

One skilled in the art will appreciate that a "system" could be embodied as a personal computer, a server, a console, a personal digital assistant (PDA), a cell phone, a tablet computing device, a smartphone, a smart-wearable device, or any other suitable computing device, or combination of devices. Presenting the above-described functions as being performed by a "system" is not intended to limit the scope of the present application in any way but is intended to provide one example of many embodiments. Indeed, methods, systems, and apparatuses disclosed herein may be implemented in localized and distributed forms consistent with computing technology.

It should be noted that some of the system features described in this specification have been presented as modules in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction or many instructions and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only, and the scope of the application is to be defined solely by the appended claims when considered with a full range of equivalents and modifications (e.g., protocols, hardware devices, software platforms, etc.) thereto.

What is claimed is:

1. An apparatus comprising:
a memory;
a plurality of network connection ports; and
a processor configured to
    connect, by an additional router, to a local area network (LAN) managed by an existing router,
    assign an Internet Protocol (IP) address of the existing router to the additional router,
    scan the LAN with the additional router to identify IP addresses and routing table attributes of existing devices of the LAN which are assigned by the existing router,
    detect that the existing router has disappeared from the LAN, and
    in response, assume the IP address of the existing router at the additional router, generate an additional routing table with the routing table attributes, and grant the existing devices the IP addresses assigned by the existing router.

2. The apparatus of claim 1, wherein the processor is configured to scan the LAN for a mask, a default gateway, an IP address of the existing router, and a Domain Name System (DNS).

3. The apparatus of claim 2, wherein the processor is configured to enable the mask, the default gateway, and the DNS for the existing devices of the LAN.

4. The apparatus of claim 1, wherein the processor is configured to receive the IP address from the existing router via a dynamic host configuration protocol (DHCP) client and scan the LAN based on the IP address.

5. The apparatus of claim 1, wherein the processor is configured to perform an Address Resolution Protocol (ARP) scan of the LAN to discover and identify the existing devices of the LAN.

6. The apparatus of claim 1, wherein the processor is configured to transmit an Address Resolution Protocol (ARP) announcement to the existing devices which announces a presence of the additional router.

7. The apparatus of claim 1, wherein the processor is configured to scan the LAN to identify a network numbering schema of the existing router, and assign a new IP address to a newly connected device based on the network numbering schema.

8. A method comprising:
connecting, by an additional router, to a local area network (LAN) managed by an existing router;
assigning an Internet Protocol (IP) address of the existing router to the additional router;
scanning the LAN with the additional router to identify IP addresses and routing table attributes of existing devices of the LAN which are assigned by the existing router,
detecting that the existing router has disappeared from the LAN; and
in response to the detecting, assuming the IP address of the existing router at the additional router, generating an additional routing table with the routing table attributes, and granting the existing devices the IP addresses assigned by the existing router.

9. The method of claim 8, wherein the scanning further comprises scanning the LAN for a mask, a default gateway, an IP address of the existing router, and a Domain Name System (DNS).

10. The method of claim 9, wherein the assuming comprises enabling the mask, the default gateway, and the DNS for the existing devices of the LAN.

11. The method of claim 8, wherein the connecting comprises receiving the IP address from the existing router via a dynamic host configuration protocol (DHCP) client and the scanning comprises scanning the LAN based on the IP address.

12. The method of claim 8, wherein the scanning comprises performing an Address Resolution Protocol (ARP) scan of the LAN to discover and identify the existing devices of the LAN.

13. The method of claim 8, wherein the assuming comprises transmitting an Address Resolution Protocol (ARP) announcement to the existing devices which announces a presence of the additional router.

14. The method of claim 8, wherein the scanning comprises scanning the LAN to identify a network numbering schema of the existing router and assigning a new IP address to a newly connected device based on the network numbering schema.

15. A non-transitory computer-readable storage medium comprising instructions which when executed by a processor cause the processor to perform:
connecting, by an additional router, to a local area network (LAN) managed by an existing router;
assigning an Internet Protocol (IP) address of the existing router to the additional router;
scanning the LAN with the additional router to identify IP addresses and routing table attributes of existing devices of the LAN which are assigned by the existing router,
detecting that the existing router has disappeared from the LAN; and
in response to the detecting, assuming the IP address of the existing router at the additional router, generating an additional routing table with the routing table attributes, and granting the existing devices the IP addresses assigned by the existing router.

16. The non-transitory computer-readable storage medium of claim 15, wherein the scanning further comprises scanning the LAN for a mask, a default gateway, an IP address of the existing router, and a Domain Name System (DNS).

17. The non-transitory computer-readable storage medium of claim 16, wherein the assuming comprises enabling the mask, the default gateway, and the DNS for the existing devices of the LAN.

18. The non-transitory computer-readable storage medium of claim 15, wherein the connecting comprises receiving the IP address from the existing router via a dynamic host configuration protocol (DHCP) client and the scanning comprises scanning the LAN based on the IP address.

19. The non-transitory computer-readable storage medium of claim 15, wherein the scanning comprises performing an Address Resolution Protocol (ARP) scan of the LAN to discover and identify the existing devices of the LAN.

20. The non-transitory computer-readable storage medium of claim 15, wherein the assuming comprises transmitting an Address Resolution Protocol (ARP)

announcement to the existing devices which announces a
presence of the additional router.

\* \* \* \* \*